S. E. AND W. W. MORRAL.
CORN HUSKING DEVICE.
APPLICATION FILED MAY 17, 1919.

1,430,671.

Patented Oct. 3, 1922.
4 SHEETS—SHEET 3.

INVENTOR.
S. E. Morral
W. W. Morral
BY
ATTORNEY.

S. E. AND W. W. MORRAL.
CORN HUSKING DEVICE.
APPLICATION FILED MAY 17, 1919.

1,430,671.

Patented Oct. 3, 1922.
4 SHEETS—SHEET 4.

INVENTOR.
S. E. Morral
BY W. W. Morral
Edward Reed
ATTORNEY.

Patented Oct. 3, 1922.

1,430,671

UNITED STATES PATENT OFFICE.

SAMUEL E. MORRAL AND WILLIAM W. MORRAL, OF MORRAL, OHIO.

CORN-HUSKING DEVICE.

Application filed May 17, 1919. Serial No. 297,735.

*To all whom it may concern:*

Be it known that we, SAMUEL E. MORRAL and WILLIAM W. MORRAL, citizens of the United States, residing at Morral, in the county of Marion and State of Ohio, have invented certain new and useful Improvements in Corn-Husking Devices, of which the following is a specification, reference being had therein to the accompanying drawing.

This invention relates to corn husking devices. One object of the invention is to provide a simple efficient husking device which will separate the ears of corn from the stalks and husk the ears, without breaking or injuring the stalks; and, further, to provide such a device in which the stalks will be fed to the operating devices with the ear in position to be engaged thereby.

Another object of the invention is to provide a device of this kind which can be moved from shock to shock in the field, thus enabling the corn to be husked from the shock and the fodder reshocked in the same manner as when husked by hand.

A further object of the invention is to provide a device of this kind which cannot be easily choked down or rendered inoperative.

Other objects of the invention will appear as the mechanism is described in detail.

In the accompanying drawings

Figures 1, 7:
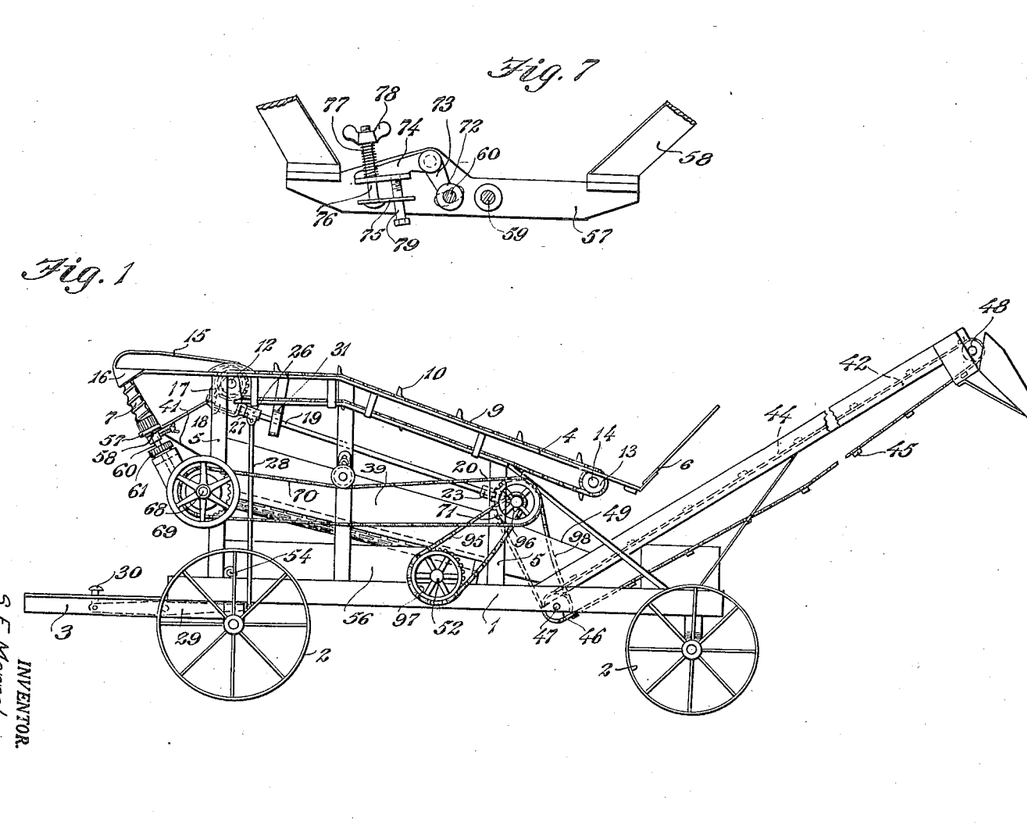
Fig. 1 is a side elevation of a corn husking machine embodying our invention.
Fig. 7 is a detail view showing the yieldable mounting for one of the snapping rollers.
Figures 2, 6:
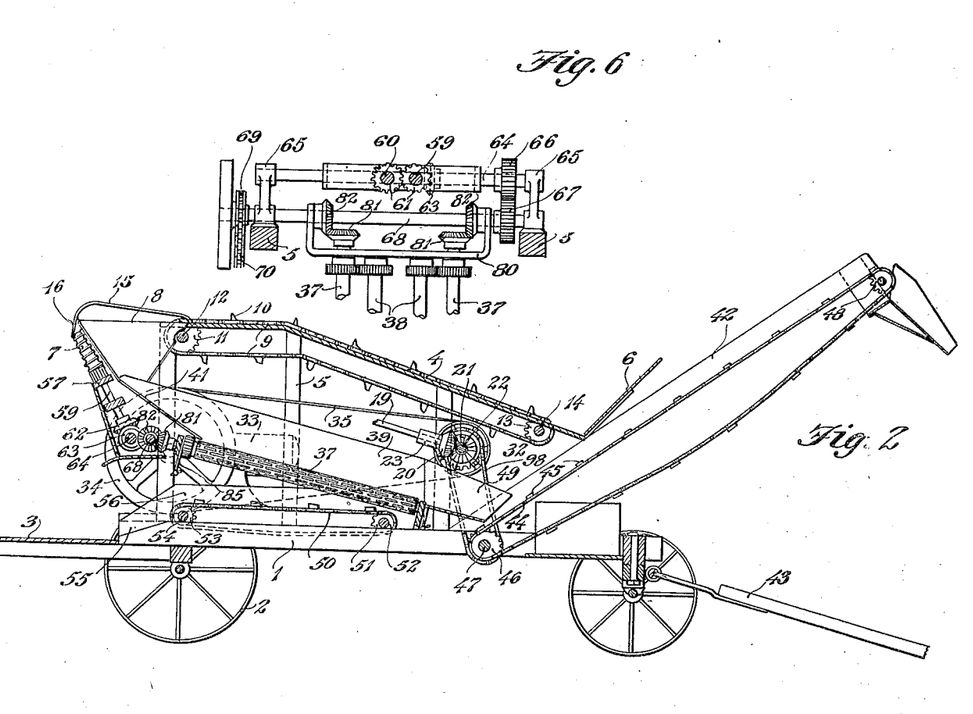
Fig. 2 is a sectional view taken longitudinally of such a machine.
Fig. 6 is a sectional detail view showing the operating mechanism for the ear removing devices and the husking devices.
Figures 3, 8, 9:
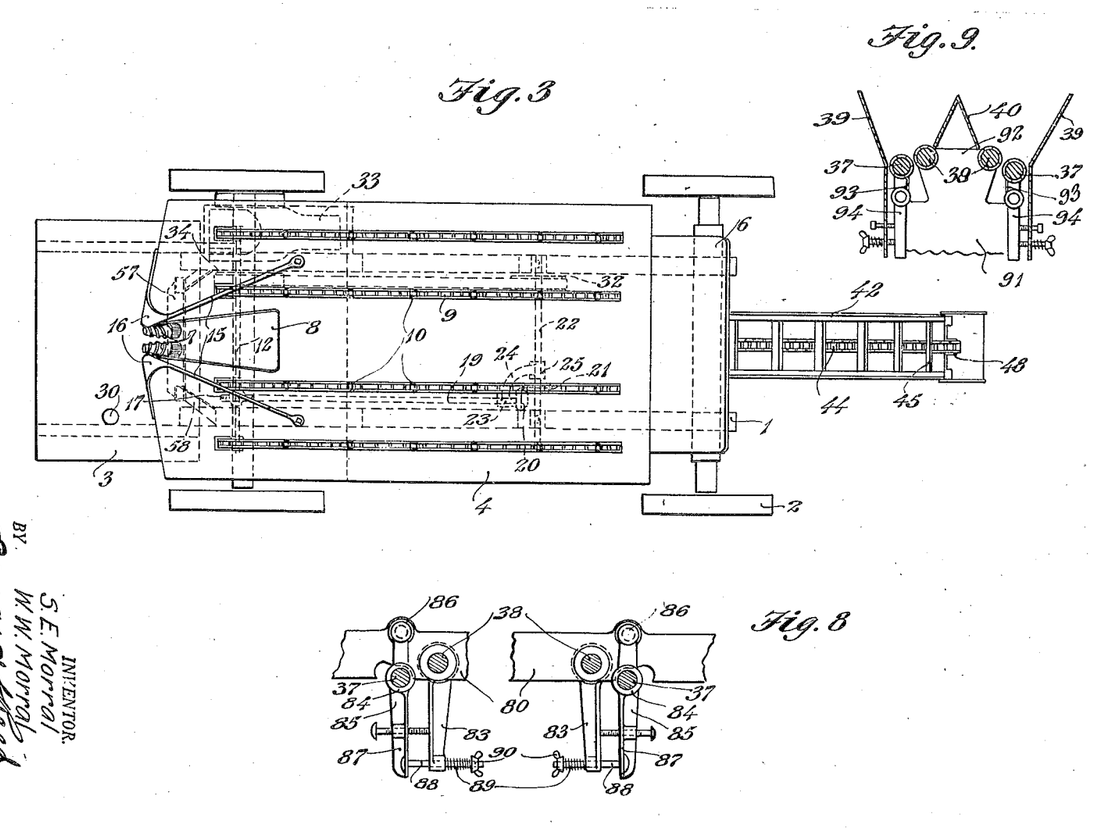
Fig. 3 is a top plan view of the same.
Fig. 8 is a detail view showing the yieldable mountings for the husking rollers.
Fig. 9 is a transverse sectional view of the husking devices showing the bearings for the forward ends of the husking rollers.
Figure 4:
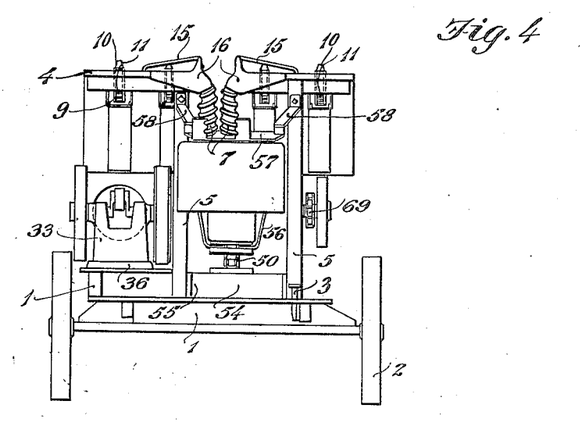
Fig. 4 is a rear elevation of such a machine.
Figure 5:
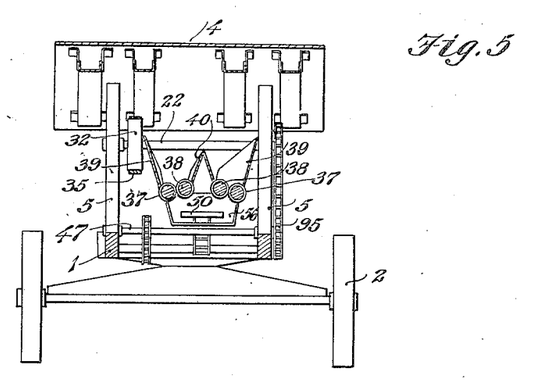
Fig. 5 is a transverse sectional view of the same.

In these drawings we have illustrated one embodiment of the invention and have shown the same as mounted on a truck comprising a frame 1 carried by ground wheels 2 and having at its rear end an operator's platform 3. Mounted on the truck frame and spaced some distance above the same is a platform 4 to receive the corn which is to be husked. This platform is here shown as supported by upright standards 5 and as having its forward end depressed to facilitate the placing of the corn thereon. A guard 6 is arranged at the lower end of the platform to retain the corn thereon. At the rear end of the platform, and above the operator's platform 5, are arranged suitable ear removing devices which are here shown as snapping rollers 7. These snapping rollers are of a known construction and their operation need not be described in detail. Suffice it to say that the upper portions of the rollers are in the form of tapered screws, and that the lower ends are provided with parts which cooperate to pinch the ear from the stalk, the arrangement of the rollers being such as to provide a space between the upper ends thereof to receive the stem by means of which the ear is connected with the stalk. The upper ends of the snapping rollers terminate close to and just beneath the rear end of the platform 4 and this platform is preferably provided with an opening 8, through which the ears of corn may drop while the stalks remain upon the platform, thus causing the continued movement of the stalks to bring the ears in engagement with the forward side of the snapping rollers while the stalk is carried over and beyond the snapping rollers and dropped on the rear side thereof. The walls of the opening 8 converge toward the snapping rollers so that as the stalk passes over the snapping rollers the stem of the ear will enter the space between the upper ends of the snapping rollers and will be carried downward by the screw portions thereof to bring the stem into engagement with the lower parts of the rollers, which sever the same and permit the ear to drop to the husking devices, as will be hereinafter explained, and the stock to drop onto the operator's platform 3 in front of the operator, from which they can be removed and reshocked in the usual manner. A suitable conveyor is preferably provided to move the stalks of corn along the platform 4, in a direction transverse to their length, toward the ear removing devices. In the present construction this conveyor comprises a series of endless chains 9 provided with fingers 10, and extending about sprocket wheels 11 mounted on a shaft 12 at the rear end of the platform, and about sprocket wheels 13 mounted on a shaft 14 at the forward end of the platform, the shafts for the sprocket wheels being arranged beneath the platform so that the latter will lie between the upper and lower stretches of the conveyor chains. It will be apparent, however, that any suitable conveyor may be employed and that this conveyor may be of such a character as to render the use of a platform, such as shown at 4, unnecessary. Suitable guides are provided to engage the ears as the stalks move rearwardly and impart lengthwise movement to the stalks, to move the ears into positions above the opening 8, and in alinement with the snapping rollers. As here shown, these guides comprise rods 15 secured to the platform 4 and spaced a short distance above the same. The forward ends of the rods are spaced a considerable distance apart so that all, or practically all, the ears on the stalks which are being advanced by the conveyor will enter the space between the rear ends of the rods. The rods converge forwardly and are connected at their forward ends with guard plates 16 secured to the corners of the platform 4 at the rear end of the opening 8. These guard plates, and consequently the ends of the guides, lie close to and slightly above the upper ends of the snapping rollers, so that when the stalks are moved along the guides with the ears hanging through the opening 8, the ears will be brought into engagement with the forward sides of the snapping rollers while the stalks will be carried over and beyond the snapping rollers. The conveyor may be arranged to carry the corn rearwardly as far as may be desired, but we prefer that it should terminate a short distance in front of the snapping rollers as a more efficient operation can be had if the stalks are carried beyond the snapping rollers by hand. In the present instance, the conveyor is arranged to carry the stalks well beyond the front ends of the guides where they can be easily grasped by the operator and moved one by one into engagement with the snapping rollers.

The driving mechanism for operating the conveyor is of such a character that it can be disconnected therefrom by the operator to enable him to control the delivery of the corn to feeding position. As here shown, the shaft 12 has secured thereto a worm wheel 17 with which meshes a worm 18 mounted on a shaft 19 provided at its rear end with a beveled gear 20 which meshes with a corresponding beveled gear 21 secured to a shaft 22 journaled in suitable bearings on the forward standards of the truck frame 1 and constituting the main driving shaft for the mechanism as a whole. The shaft 19 is so mounted that the worm 18 can be moved into and out of mesh with the worm wheel 17 and, as here shown, the forward end of the shaft 19 is journaled in a bearing 23 formed at one end of a bracket 24, which is mounted at its other end on the shaft 22, by means of a bearing 25, arranged at right angles to the bearing 23. This manner of mounting the shaft permits the latter to have pivotal movement about the axis of the shaft 22. The rear end of the shaft is journaled in a vertically movable bearing 26 having secured thereto an arm 27 with which is connected a rod 28 extending downwardly and connected at its lower end with the forward end of a lever 29 which is pivotally mounted on the truck frame beneath the operator's platform 3, and has connected with its rear end a plunger 30 which extends upwardly through the operator's platform in a position to be engaged by the foot of the operator. So long as the operator maintains a pressure on the plunger 30 the screw 18 will be held in mesh with the worm 17 and the conveyor will be operated. When he relieves the pressure on the plunger 30 the shaft 19 and screw 18 will move downward by gravity and the worm 18 will be carried out of mesh with the worm wheel. The downward movement of the shaft may be limited in any suitable manner and, in the present instance, we have shown a hooked shaped bracket 31 extending downwardly from the platform 4 and adapted to receive the shaft and check its downward movement after the worm has been disengaged from the worm wheel.

The mechanism as a whole may be operated by applying power to the main shaft 22 in any suitable manner and, in the present construction, this shaft is shown as provided with a belt pulley 32 by means of which it may be belted to a suitable motor or other driving device. We prefer, however, to mount an internal combustion engine upon the truck frame, and have here shown such an engine at 33, the belt wheel 34 of which is connected with the pulley 32 by a belt 35. Inasmuch as many farmers now own internal combustion engines, which are utilized for various purposes, we prefer to provide the husker without the engine and to permit the owner to use his own engine thereon if he so desires. Consequently, the husker is merely provided with a supporting base or platform 36 on which any suitable engine may be mounted.

The ears of corn, as they are separated from the stalks by the snapping rollers, move by gravity to the husking devices which are preferably in the form of husking rollers. In the present construction we have provided two pairs of husking rollers, each pair comprising a roller 37 and a roller 38. These husking rollers extend forwardly and downwardly from the ear removing devices and are journaled in suitable bearings carried by the truck frame. Preferably, guard plates 39 extend upwardly from the two outermost rollers 37, while a central V-shaped guard plate 40 extends upwardly between the two inner husking rollers 38, thus each pair of husking rollers lies at the bottom of a trough shaped structure which serves to properly position the ears with relation thereto. An inclined plate or chute 41 extends from the lower end to the snapping rollers to the husking rollers and serves to deliver the ears thereto by gravity. The ears, after they have been husked, may be delivered from the husking rollers to any suitable receiving device and, in the present instance, this receiving device is in the form of a conveyor 42 which extends upwardly from the forward end of the husking rollers and serves to deliver the husked ears to a wagon or to any other suitable point. In the present construction the truck has been provided with a device, such as a tongue 43, by means of which it may be connected with a wagon or other propelling mechanism, and the conveyor 42 is inclined upwardly and forwardly so that it will deliver the corn into the bed of the wagon with which the truck is connected. This conveyor may take various forms, but is here shown as comprising a trough like structure, the bottom of which is formed by an endless chain 44 having secured thereto at intervals cleats 45. This chain passes about a sprocket wheel 46 carried by a shaft 47 journaled on the truck frame, and extends at its forward end about a sprocket wheel 48 journaled at the forward end of the conveyor structure. A chute 49 extends from the end of the husking rollers to the conveyor and serves to deliver the husked ears to the latter.

The husks which are separated from the ears pass between the husking rollers and are dropped beneath the same and, in the present construction, we have provided an endless chain conveyor 50 beneath the husking rollers to receive the husks, carry them rearwardly and deposit them on the operator's platform 3 along with the stalks of corn, or fodder, so that they can be removed and placed in the shock with the fodder. As here shown, the endless chain 50 of the conveyor extends about a sprocket wheel 51 mounted on a shaft 52 journaled on a truck frame near the forward ends of the husking rollers, and also extends about a sprocket wheel 53 mounted on a shaft 54 carried by the truck frame near the rear ends of the husking rollers. A chute 55 extends from the rear end of the conveyor to the operator's platform 3. The endless chain conveyor 50 has its upper stretch mounted in a trough like structure 56 which serves to prevent the escape of the husks therefrom.

The several moving parts of the mechanism may be driven from the main shaft 22 in any suitable manner. In the present instance the snapping rollers are journaled on a supporting frame or bracket 57 which is carried by arms 58 extending rearwardly from the rear standards 5 of the truck frame. The shafts 59 and 60 which carry the snapping rollers extend through the bracket 57 and are provided with intermeshing gears 61. One of the shafts, in the present instance the shaft 59, is provided at its lower end with a beveled gear 62 which meshes with a corresponding beveled gear 63 on a shaft 64 which is journaled in bearing brackets 65 and has secured thereto a gear 66 which meshes with a gear 67 on a shaft 68, which is also journaled in the bearing brackets 65, these brackets being preferably mounted on the rear standards 5 of the truck frame. The shaft 68 is provided with a sprocket wheel 69 which is connected by a sprocket chain 70 with a sprocket wheel 71 on the driving shaft 22. It will be apparent, therefore, that the snapping rollers will be rotated in opposite directions by the main driving shaft. To prevent the choking down or possible breaking of the snapping rollers, due to the entrance of too much material or to thick a stem between the same, we prefer to make one of the snapping rollers yieldable so that it can be moved toward and away from the other roller when excessive pressure is applied thereto. To this end the shaft 60 of the one snapping roller is mounted in a movable bearing 72 which is carried by one arm 73 of a bell crank lever pivotally mounted on the under side of the supporting bracket 57 and having its other arm 74 yieldably connected with the bracket 57. As here shown, the arm 74 extends substantially parallel with a projection or plate 75 rigidly secured to the bracket 57, and a bolt 76 extends through the plate 75 and through the arm 74 and has a spring 77 coiled about the same and confined between the arm 74 and a nut 78 on the end of the bolt. This spring tends to rock the bell crank lever in a direction to move the shaft 60, and its roller, toward the shaft 59 and its roller. This movement is limited by means of a stop 79 screw threaded in the plate 75 and arranged to be engaged by the arm 74 of the bell crank lever. When excessive pressure is applied to the snapping rollers that roller carried by the shaft 60 will yield to permit the excess material or the thick stem to pass between the same. Ordinarily, the yielding movement is very slight and will not throw the gears 60 and 61 out of mesh.

The rear ends of the two pairs of husking rollers 37 and 38 are journaled in a supporting bracket 80 and are geared together and the outer rollers 37 are provided with beveled gears 81 meshing with corresponding gears 82 on the shaft 68. It is desirable also that the husking rollers should have a slight yielding movement relatively one to the other to prevent them from being choked down or the driving mechanism broken by the entrance of too thick a mass of husks between the same. To this end they are mounted in a manner similar to the manner in which the snapping rollers are mounted. The inner husking rollers 38 are mounted in fixed bearings in the supporting bracket or frame 80 and this frame is provided with depending arms 83 extending downwardly from points adjacent to the respective fixed bearings for the rollers 38. The outer rollers 37 are journaled in movable bearings 84, which are preferably carried by arms 85 pivotally mounted on the frame or supporting structure 80 at points above the bearings 84, as shown at 86. These arms are provided with flanges 87 and a bolt 88 extends through each flange and through the respective arms 83 and has coiled about the same a spring 89 which is confined between the arm 83 and a nut 90 on the end of the bolt, thus the arms 85 and, consequently, the outer husking rollers, are permitted to yield under excessive pressure. The forward ends of the rollers are, of course, similarly mounted, so that the outer rollers may swing bodily toward and from the inner rollers. As here shown, the forward ends of the husking rollers are carried by a bearing plate 91 and an upwardly extending central portion 92 in which are formed the bearings for the fixed rollers 38. At the lateral edges of the plate 91 are upwardly extending portions 93 having mounted thereon movable bearings for the rollers 37, which bearings are preferably formed in arms 94 constructed and mounted in a manner similar to that which is described in connection with the arms 85.

The husk conveyor 52 is driven from the main shaft 22 by means of a sprocket chain 95 extending about a sprocket wheel 96 on the shaft 22 and about a sprocket wheel 97 on the shaft 52. The conveyor chain 44 of the ear conveyor 42 is driven by a sprocket chain extending between the shafts 22 and 47, as shown at 98.

The construction of the apparatus will be readily understood from the foregoing description of the several parts thereof, and it will be apparent that the stalks of corn with the ears attached are placed on the platform 4 transversely to the conveyor and are moved rearwardly by the conveyor onto the guides at the rear end of the platform, in which position the ears will drop through the opening in the platform while the stalks continue their movement along the guides. When they reach this position they are grasped by the operator on the platform 3, who manually moves each stalk past the upper ends of the snapping rollers and causes the stem of the ear to enter the space between the snapping rollers, after which he releases the stalk and it is carried downward by the snapping rollers and the ear separated therefrom. The ear then moves by gravity to the husking rollers, which strip the husk therefrom and deliver the ear to the ear conveyor 42, which deposits it in the wagon or other suitable receptacle. The husks pass between the husking rollers to the conveyor 50 and are deposited on the operator's platform along with the stalks of corn from which the ears have been removed. These stalks and the husks are then gathered up together and reshocked. The device being portable and having its own power plant, can be readily moved from shock to shock in the field and the corn husked from the shock and the fodder reshocked in exactly the same manner as where the corn is husked by hand. It will be apparent that the mechanism is simple in its construction and in its operation and that the several parts, and more particularly the snapping rollers and the husking rollers, are of such a character and construction that they will not choke down.

While we have shown and described one embodiment of the invention, we wish it to be understood that we do not desire to be limited to the details thereof, as various modifications may occur to a person skilled in the art.

Having thus fully described our invention, what we claim as new and desire to secure by Letters Patent is:

1. In an apparatus of the character described, an ear removing device, a conveyor to act upon substantially horizontal stalks of corn to move the same transversely toward said ear removing device, and a stationary guide arranged adjacent to said conveyor in the path of movement of the stalks and adapted to receive the same thereon and to engage the ears of corn on said stalks and impart longitudinal movement to said stalks to position the ears with relation to said ear removing device as the stalks are moved toward the latter.

2. In an apparatus of the character described, a pair of upright snapping rollers, a conveyor to move substantially horizontal stalks of corn transversely toward said snapping rollers, and a stationary guide adjacent to said conveyor and adapted to receive the stalks of corn thereon and to engage the ears of corn on said stalks and position them with relation to said snapping rollers as said stalks are moved toward the latter, said guide also being arranged to cause the stalks of corn to be moved over the upper ends of said upright snapping rollers and to permit the ears to engage the snapping rollers on that side adjacent to said conveyor, whereby the stem of the ear will enter the space between the snapping rollers.

3. In an apparatus of the character described, a platform to receive stalks of corn, an ear removing device supported at one end of said platform, a conveyor to move said stalks of corn on said platform transversely toward said ear removing device, and a stationary guide adjacent to said conveyor and adapted to receive the stalks of corn thereon and to engage the ears of corn on said stalks and aid in imparting longitudinal movement to said stalks to position said ears with relation to said ear removing device as said stalks of corn are moved toward the latter.

4. In an apparatus of the character described, a platform to receive stalks of corn, an ear removing device at one end of said platform, a stationary guide carried by and projecting above said platform to receive the stalks of corn and to engage the ears of corn on said stalks and aid in imparting longitudinal movement to said stalks to position said ears with relation to said ear removing device as said stalks of corn are moved toward the latter.

5. In an apparatus of the character described, a platform to receive stalks of corn, an ear removing device at one end of said platform, guides supported by said platform and spaced above the same, said guides converging rearwardly toward said ear removing device and terminating above said ear removing device, whereby the ears of corn in said stalks may be moved into engagement with said ear removing device and the stalks will be carried beyond the same.

6. In an apparatus of the character described, a platform to receive stalks of corn and having an opening extending inwardly from the rear edge thereof, an ear removing device arranged adjacent to said opening at the rear edge of said platform, and a stationary guide above said platform to engage the ears of corn on said stalks and adapted to aid in moving them in the direction of the length of the stalks to bring them into line with said opening and cause them to engage said ear removing device as the stalks are moved rearwardly over said opening.

7. In an apparatus of the character described, a platform to receive stalks of corn and having an opening extending inwardly from one edge thereof, an ear removing device arranged adjacent to said opening at the rear edge of said platform, and converging guides arranged on the opposite sides of said opening to engage the ears of corn on said stalks and position them with relation to said ear removing device.

8. In an apparatus of the character described, a platform to receive stalks of corn and having an opening to receive the ears as the stalks are moved transversely along said platform, an ear removing device comprising upright members arranged in line with said opening to intercept the ears of corn and having their upper ends so arranged with relation to said platform that said stalks will pass above said upright members as they move toward the same, and spaced apart to receive the stem of an ear as the stalk is moved across the upper end of said ear removing device.

9. In an apparatus of the character described, a platform to receive stalks of corn and having an opening to receive the ears as said stalks are moved transversely along said platform, the side walls of said opening converging in the direction of the movement of said stalks, and an ear removing device arranged in line with said opening to intercept the ears of corn and to receive the stems of the ears of corn as the stalks are moved beyond said ear removing device.

10. In an apparatus of the character described, an ear removing device comprising upright members having their upper ends spaced apart to receive the stem of an ear of corn between them, and means for guiding an ear of corn into engagement of said ear removing device and for guiding the stalk carrying said ear across the upper end of said ear removing device, thus causing the stem of the ear to enter the space between said upright members.

11. In an apparatus of the character described, an ear removing device comprising upright members having their upper ends spaced apart to receive the stem of an ear of corn between them, and guides converging toward said ear removing device for guiding an ear of corn into engagement therewith and for guiding the stalk carrying said ear across the upper end of said device thus causing the stem of the ear to enter the space between said upright members.

12. In an apparatus of the character described, a platform to receive stalks of corn and having an opening extending inwardly from one edge thereof through which the ears of corn may project as the stalks are moved toward said edge of said platform, and an ear removing device supported adjacent to said edge of said platform and comprising upright members spaced apart and arranged in substantial alinement with said opening to intercept the ears on said stalks as the latter are moved beyond said edge of said platform, said upright members having their upper ends below the path in which said stalks travel.

13. In an apparatus of the character described, a platform to receive stalks of corn and having an opening extending inwardly from one edge thereof, means for moving the stalks transversely toward and across said opening, snapping rollers arranged in an upright position beneath said platform and having their upper ends terminating near the rear end of said opening.

14. In an apparatus of the character described, a platform to receive stalks of corn and having an opening extending inwardly from one edge thereof, snapping rollers arranged in an upright position beneath said platform and having their upper ends arranged adjacent to the rear end of said opening, guides mounted on opposite sides of said opening, converging toward said snapping rollers and arranged to support the stalks of corn until they have passed beyond said snapping rollers.

15. In an apparatus of the character described, a platform to receive stalks of corn and having an opening extending inwardly from one edge thereof, an ear removing device comprising upright members having their upper ends arranged near the outer end of said opening to receive the stem of an ear of corn between them, guides to engage the ears of corn on said stalks and position them with relation to said ear removing device and arranged to support said stalks above the upper end of said ear removing device, and a conveyor to move the stalks of corn transversely onto said guides and toward said ear removing device.

16. In an apparatus of the character described, a platform to receive stalks of corn, an ear removing device comprising upright members having their upper ends supported adjacent to one edge of said platform, a conveyor to move the stalks of corn transversely along said platform to a point adjacent to said ear removing device, and guides above said platform at one end of said conveyor for positioning the ears of corn with relation to said ear removing device and for supporting the stalks until they have been moved beyond said ear removing device.

17. In an apparatus of the character described, a platform to receive stalks of corn and having an opening extending forwardly from the rear edge thereof, snapping rollers supporting beneath the rear portion of said platform and having their upper ends arranged adjacent to the rear end of said opening, guides supported by said platform on opposite sides of said opening and converging toward said snapping rollers, and a conveyor to move said stalks of corn along said platform and onto said guides.

18. In an apparatus of the character described, a platform to receive stalks of corn and having an opening extending forwardly from the rear edge thereof, snapping rollers supported beneath the rear portion of said platform and having their upper ends arranged adjacent to the rear end of said opening, guides supported by said platform on opposite sides of said opening and converging toward said snapping rollers, a conveyor to move said stalks of corn along said platform and onto said guide, a worm wheel connected to said conveyor, a worm mounted for movement into and out of engagement with said worm wheel and means for rotating said worm.

19. In an apparatus of the character described, a platform adapted to receive stalks of corn, a pair of upright snapping rollers supported adjacent to the edge of said platform, stationary guides to position the ears on said stalks of corn with relation to said snapping rollers, said guides terminating near the upper ends of said snapping rollers, means for rotating said snapping rollers, and a yieldable support for one of said snapping rollers.

20. In a device of the character described, a pair of upright snapping rollers, means for causing stalks of corn to be delivered to said snapping rollers with the ear on one side of said snapping rollers and the stalk on the other side thereof, means for actuating said snapping rollers, and means for yieldably supporting one of said snapping rollers.

21. In a corn husking apparatus, a supporting frame, an operator's platform at the rear end of said frame, a corn receiving platform carried by and supported above said frame, upright snapping rollers mounted at the rear end of said last mentioned platform, a conveyor for moving the stalks of corn transversely over said platform toward said snapping rollers, husking rollers mounted beneath said platform and inclined toward said snapping rollers, a conveyor mounted on said supporting frame and arranged to receive the husked ears from the husking rollers, a second conveyor arranged beneath said husking rollers to receive the husks therefrom and deliver the same to said operator's platform.

22. In a corn husking apparatus, a supporting structure, a corn receiving platform carried by said structure, an operator's platform arranged near the rear end of said corn receiving platform, snapping rollers mounted in an upright position above said operator's platform and having their upper ends arranged adjacent to the rear edge of said corn receiving platform, and a conveyor to move stalks of corn transversely towards said snapping rollers, guides to position the ears of corn on said stalks with relation to said snapping rollers as the stalks are moved toward the latter, husking rollers arranged beneath said corn receiving platform and adapted to receive the ears from said snapping rollers, and means for delivering the husks from said husking rollers to said operator's platform.

23. In a corn husking apparatus, a supporting structure, an operator's platform carried by said structure, a corn receiving platform on said structure, snapping rollers arranged in an upright position above said operator's platform and having their upper ends arranged adjacent to and beneath the rear end of said corn receiving platform, said corn receiving platform having an opening therein adjacent to said snapping rollers, means for guiding the stalks of corn transversely across said opening and toward said snapping rollers, whereby the ears of corn on said stalks may project through said opening and engage said snapping rollers while the stalks will be carried over the upper ends of said snapping rollers and will pass downwardly on the opposite side thereof, and husking rollers to receive the ears from said snapping rollers.

24. In a corn husking apparatus, a supporting structure, an operator's platform carried by said structure, a corn receiving platform carried by said structure, snapping rollers arranged in an upright position above said operator's platform and having their upper ends arranged adjacent to and beneath the rear end of said corn receiving platform, said corn receiving platform having an opening therein adjacent to said snapping rollers, means for guiding the stalks of corn transversely across said opening and toward said snapping rollers, whereby the ears of corn on said stalks may project through said opening and engage said snapping rollers while the stalks will be carried over the upper ends of said snapping rollers and will pass downwardly on the opposite side thereof, husking rollers to receive the ears from said snapping rollers, and a motor mounted on said supporting structure and operatively connected with said conveyor, snapping rollers and husking rollers.

In testimony whereof, we affix our signatures hereto.

SAMUEL E. MORRAL.
WILLIAM W. MORRAL.